United States Patent Office 2,930,246
Patented Mar. 29, 1960

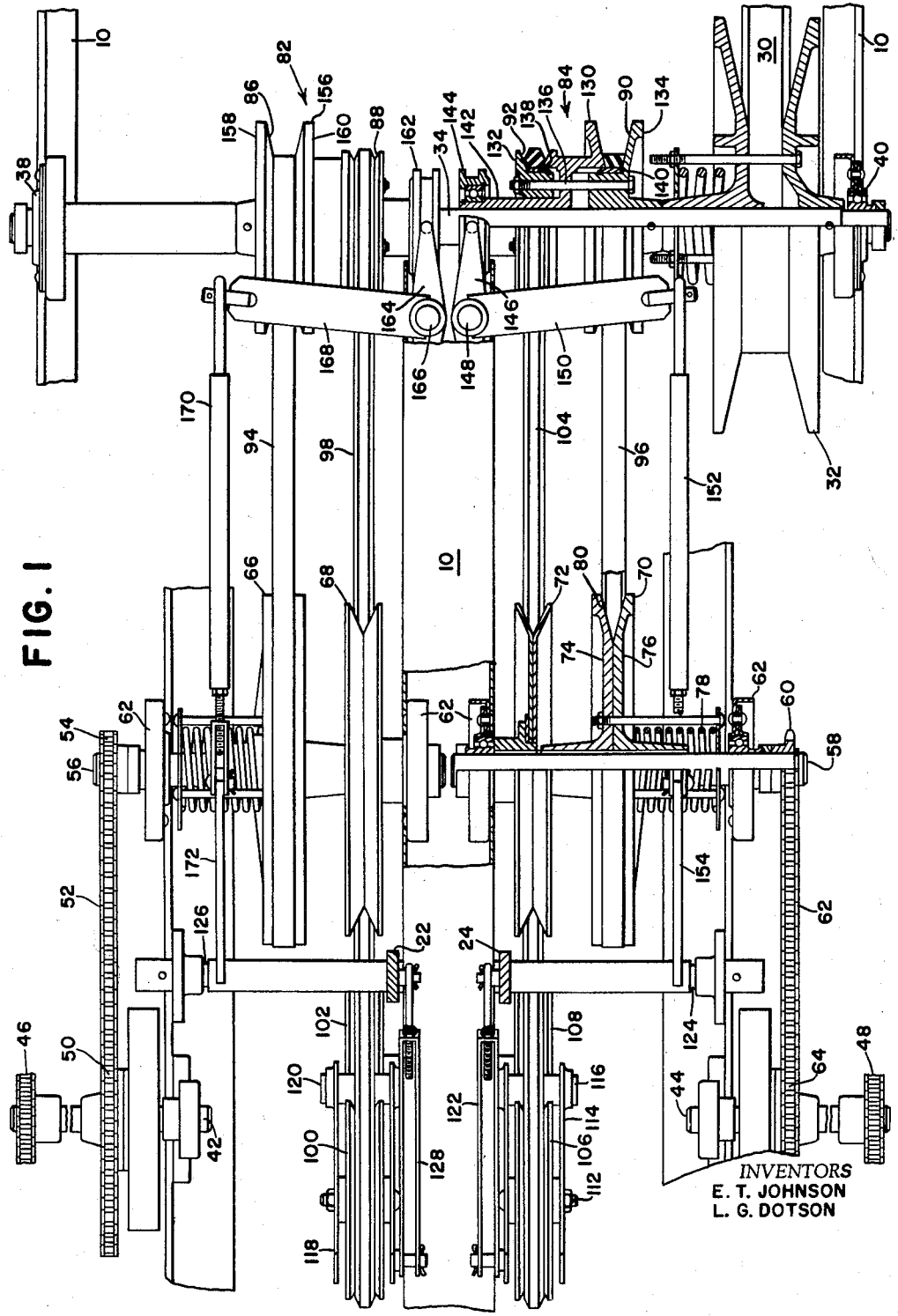

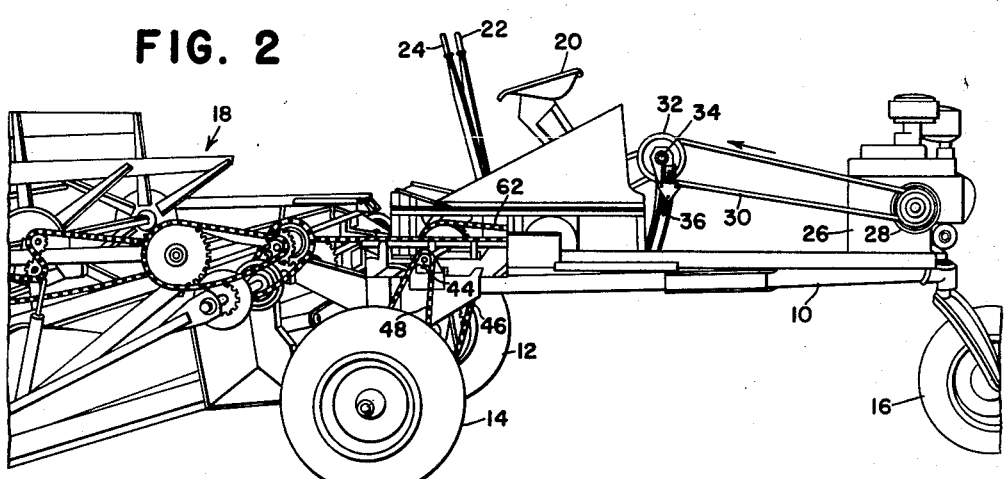

2,930,246

BELT DRIVE TRANSMISSION

Ellsworth T. Johnson, Moline, and Lloyd G. Dotson, Geneseo, Ill., assignors to Deere & Company, Moline, Ill., a corporation of Delaware Application December 12, 1958, Serial No. 780,131

6 Claims. (Cl. 74—220)

This invention relates to a transmission and more particularly to a belt-drive transmission incorporating means for producing reverse and forward speeds.

The invention finds utility in those fields in which the type of vehicle to be driven is adaptable to a simple and inexpensive yet versatile transmission wherein the situation will permit the use of belts and sheaves rather than enclosed gearing. In the present case, the transmission is applied to a self-propelled windrower, which is a relatively light-weight machine comprising a mobile frame carrying the harvesting mechanism ahead of it. In a machine of this character, maneuverability in the field is required, and it is particularly important that the machine be capable of advancing at varying speeds and also steerable to turn relatively sharp or right-angled corners. In the interests of reconciling low cost with a quality machine, the components thereof must be durable, inexpensive and of such design as to permit ready servicing.

According to the present invention, an input shaft is capable of driving a pair of output shafts, one for each of the front wheels of the windrower, and, for each of these wheels, the input shaft includes a dual driving sheave and the associated output shaft has a forward sheave and a reverse sheave. The dual driving sheave is associated with clutch means which selectively incurs driving of forward and reverse belts to produce the desired change in direction. In addition, part of the dual driving sheave and at least the forward sheave incorporate variable-speed means of the type in which the effective driving diameters of the sheaves may be varied so as to produce a plurality of forward speeds. In the interests of compactness, the forward and reverse sheaves, being on the same shaft are necessarily coaxial, and, whereas the forward belt is trained simply about the driving and forward sheaves, the reverse belt is associated with an idler so that the outer side of one run thereof is in driving relation to the reverse sheave. Consequently, as the clutch means in the dual driving sheave is selectively operative to either side of neutral, one belt is tightened while the other remains loose. It is a further feature to use a shiftable idler with the reverse belt and to relate the position of this idler to the cluch means of the driving sheave so that when the clutch means is operative to relax the reverse belt, the shiftable idler is moved to a position carrying the reverse belt away from the reverse sheave, thus avoiding friction and drag. The invention features such other things as simple controls, flexibility, and adaptability of the design to machines other than of the representative character referred to.

The foregoing and other important objects and desirable features inherent in and encompassed by the invention will become apparent as a preferred embodiment thereof is disclosed, by way of example, in the ensuing description and accompanying sheets of drawings, the several figures of which are described below.

Fig. 1 is a plan of the transmission, partly in section and with portions broken away to clearly illustrate the basic components.

Fig. 2 is a fragmentary perspective illustrating a self-propelled windrower in which the transmission finds utility.

Fig. 3 is a simplified side view, on a reduced scale, of the transmission shown in Fig. 1, illustrating the neutral position of the system.

Fig. 4 is a similar view illustrating the forward position.

Fig. 5 is a similar view illustrating the reverse position.

The representative self-propelled windrower illustrated in Fig. 2 comprises a longitudinal main frame 10 having right and left hand front wheels 12 and 14, respectively, and a single castering rear wheel 16, the machine being of the type in which steering is accomplished by varying the relative speeds of the front wheels 12 and 14. Suitable supporting structure extends forwardly from the main frame 10 and carries harvesting mechanism or a header 18, the details of which are not material here. An operator's station on the frame, including a seat 20, has conveniently grouped controls for the machine, the significant ones here being a pair of control levers 22 and 24 for controlling the transmission to be presently described.

A rearwardly mounted internal combustion engine 26 drives an output sheave 28 which is belted at 30 to an intermediate sheave 32, and normal rotation is in the direction of the arrow shown in Fig. 2. The sheaves 28 and 32 are of the variable speed type in which the effective driving diameters are capable of being progressively increased or decreased so that the speed of the sheave 32 and the driving shaft 34 to which it is keyed may be varied as to speed even though the speed of the engine-driven sheave 28 remains constant. Any suitable mechanism may be employed for shifting the position of the sheave 32, and representative structure is illustrated at 36. So far as concerns the present invention, the variable speed character of the drive 28—30—32 may be ignored. It is referred to only as part of the illustration of the environment aspects of the machine.

The driving shaft 34 extends transversely to the longitudinal extent of the main frame 10 and is journaled at opposite ends in suitable right and left hand bearings 38 and 40 (Fig. 1). The frame 10 journals right and left hand jack shafts 42 and 44 from which the right and left hand wheels are chain driven as at 46 and 48, respectively. The right hand jack shaft carries a sprocket 50 which is connected by a fore-and-aft chain 52 to a sprocket 54 on the right hand or outer end of a driven shaft 56. A coaxial and symmetrically arranged left hand driven shaft 58 has a sprocket 60 keyed thereto and this sprocket, by means of a chain 62, drives a sprocket 64 on the left hand jack shaft 44. The driven shafts 56 and 58 are suitably journaled in bearings carried on parts of the main frame 10, as indicated generally by the numeral 62. In general, and ignoring details for the moment, the engine sheave 28 drives the intermediate sheave 32 via the belt 30 and the right and left hand driven shafts 56 and 58 are driven from the shaft 34 and in turn drive the jack shafts 42 and 44 for the wheels 12 and 14 respectively. It will thus be seen that by driving one side or the other or by driving one side at a higher rate than the other, steering of the machine may be accomplished, whereas driving both sides at a uniform rate will produce straight-ahead travel. Likewise, reversal of the drive will achieve the same results in the rearward direction. The specific mechanism for accomplishing these results will be described below.

The right hand driven shaft 56 has keyed thereto a forward sheave 66 and a reverse sheave 68. Similar forward and reverse sheaves 70 and 72 are keyed to the left hand driven shaft 58. In each case, the reverse sheave is a simple sheave, but the corresponding forward sheave is of the variable speed type. The left hand forward sheave 70 is shown partly in section and will therefore be referred to as representative. As will be seen, the sheave comprises inner and outer coaxial parts 74 and 76 which are biased or spring-loaded at 78 into axial compression so that the effective driving diameter thereof is at the maximum in a belt groove 80 established by the two parts 74 and 76. This, in general, is typical construction of a variable-speed sheave. When the sheave parts 74 and 76 are moved axially apart, the groove 80 widens and becomes deeper, and a belt traveling therein will move toward the axis of the sheave, thereby reducing the effective driving diameter. When a sheave of this type is used with a similar sheave or with a sheave on a shiftable shaft, variable speeds may be obtained. It will be understood that the right hand sheave 66 is of duplicate construction and therefore need not be described.

The driving shaft 34 drives right and left hand coaxial dual driving sheaves indicated in their entireties by the numerals 82 and 84 respectively. The right hand sheave 82 affords forward and reverse belt grooves 86 and 88, and similar forward and reverse belt grooves 90 and 92 are provided in the other driving sheave 84. A right hand forward drive belt 94 is looped or trained about the right hand forward sheave 66 and the right hand forward groove 86 in the driving sheave 82. A left hand forward belt 96 occupies a similar relationship between the left hand forward sheave 70 and the left hand forward groove 90.

A right hand reverse belt 98 is received in the right hand reverse groove 88 but cannot be looped about the right hand reverse sheave 68, because it is necessary to drive this sheave in the direction opposite to that of the sheave 66. For this purpose, the belt 98 is longer than the belt 94 and is trained about a pair of right hand idlers 100 and 102. This enables placing the outer side of one run of the belt 98 in drive relation to the sheave 68, a detail which will be clearer from an examination of the corresponding left hand components in which a left hand reverse belt 104 is received in the left hand reverse groove 92 and is trained about a pair of idlers 106 and 108 and has the outer side of its upper run passing below and in drive relation to the left hand reverse sheave 72 (Figs. 3, 4, and 5). The belts 94 and 96 may be typical V-belts, and the belts 98 and 104 are typically of hexagonal section (Fig. 1).

Referring now to the left hand side of the drive, as particularly illustrated in Figs. 1, 3, 4 and 5, it will be observed that the idler 108 is journaled on a fixed shaft 110, the specific mounting of which is relatively immaterial, whereas the idler 106 is journaled on a shaft 112 which is in turn mounted on a rockable arm 114, the rockability of which is established by a rockshaft 116. By means of the rockability of the arm 114, the idler sheave 106 is capable of occupying three positions, which are shown in Figs. 3, 4, and 5, and these positions vary the tension of the upper run of the belt 104 and therefore vary the relationship of this run to the corresponding reverse driven sheave 72. For example, in Fig. 3, the upper run of the belt is relatively loose, so as to avoid friction or drag in the sheave 72 while the shaft 34 rotates relative to the driven shafts 56 and 58. In Fig. 4, the relaxation of the upper run of the belt 104 is even greater, which is desirable during forward drive of the machine in which the forward sheave 70 is driven, consequently driving not only the shaft 58 but also the sheave 72, since this sheave is keyed, as previously described, to the shaft 58. In Fig. 5, which represents the reverse drive position, the upper run of the belt 104 is more tightly engaged with the sheave 72, which is consistent with the establishment of the reverse drive, since in this case the sheave 84 drives the reverse sheave 72 via the belt 104. These details will be elaborated below.

The right hand idler arrangement 100—102 is similarly arranged and there are visible in Fig. 1 the corresponding idler arm and rockshaft at 118 and 120 respectively. The left hand shiftable idler arm 114 is connected by a link 122 to the left hand control lever 24, which itself is mounted on a suitable rockshaft as at 124. A separate coaxial rockshaft 126 mounts the other control lever 22, and this lever is connected by a link 128 to the shiftable idler arm 118 for the right hand shiftable idler 100. Linking of the shiftable idlers to the respective control levers enables selective positioning of the idlers according to lever positions, and this is coordinated with control of the respective dual driving sheaves 82 and 84 in a manner to be set out below.

Since the left hand dual driving sheave 84 is shown partly in section, it will be described in detail, with the understanding that the other sheave 82 is similarly constructed. Reference is had to Fig. 1.

The sheave 84 comprises a central part 130 suitably keyed or otherwise fixed to the driving shaft 34, which may occur either directly or through the driving connection with a pair of flanking outer parts 132 and 134. In the example shown, a plurality of bolts, as at 136, connects the three parts 130, 132 and 134 for rotation in unison but permits axial shifting of the central part relative to the two outer parts. One annular flange of the central part 130 and the corresponding annular flange on the part 132 affords the belt groove 92, previously described, and the opposite annular flanges cooperate to afford the belt groove 90, also previously described. A suitable ring or collar 138 runs freely in the groove 92, and a similar collar 140 runs freely in the groove 90. These collars carry the loose belts 104 and 96, respectively, in the neutral condition of the system, because, as will be clear, the shaft 34 is constantly rotating and consequently the dual driving sheaves 82 and 84, and their components, are also constantly rotating.

The central part 130 has an elongated hub or sleeve 142 on which is mounted a throw-out or control collar 144. The mounting is such that the collar is rotatable relative to the sleeve 142 but is non-axially shiftable relative thereto. Consequently, by means of the collar 144, and a swingable yoke 146, the central part 130 may be axially shifted toward the part 130 and consequently away from the part 132, or vice versa. When this occurs, one of the grooves 90, 92 is widened and the other is narrowed. The narrowed groove results in gripping of the associated belt to establish drive to the associated sheaves 70, 72, and the simultaneous widening of the other groove results in complete relaxation on the opposite belt. In the neutral position of the central part 130 as shown in Fig. 1, the belts 96 and 104 are loosely received in the associated grooves 90 and 92, with a minimum of friction, and neither belt is driven. The throw-out control yoke or arm 146 is part of a bell crank structure including an upright rockshaft 148 and a control arm 150 and the latter is connected by a link 152 to the left hand control lever 24 via an arm 154 rigidly associated with the lever so as to afford a bell crank. Consequently, as the control lever 24 is moved forwardly from its neutral position, the associated arm 154 pulls forwardly on the link 152, rocking the rockshaft 148 in a clockwise direction as seen in Fig. 1. This action results in axial shifting of the central part 130 toward the forward drive part 134 of the dual sheave 84, gripping the belt 96 while relaxing the belt 104 and thereby establishing forward drive to the left hand wheel 14. When the lever 24 is moved rearwardly, the opposite action occurs, and the central part 130 is shifted toward the reverse drive part 132, gripping the belt 104 and relaxing the belt 96.

The range of the lever 34 in the forward direction is greater than that in the rearward direction, which is consonant with the variable speed relationship between the sheaves 84 and 70. The sheave 70, as previously described, is spring loaded to a condition in which the sheave parts 74 and 76 abut each other, establishing the belt groove 80 at a maximum driving diameter. When the control lever 24 is shifted in its forward direction to shift the central dual sheave part 130 toward the forward drive part 134, the grip on the belt 96 is, as stated, increased. If the manual forward pressure on the lever 24 is at a minimum, the gripping of the belt 96 in the belt groove 90 will occur near the bottom of the groove, leaving the groove 80 in the sheave 70 at its maximum effective driving diameter. Therefore, the smaller "sheave" 90 will drive the larger "sheave" 80 at a speed determined by the ratio between the effective diameters of the two grooves. In this case, it would be the minimum forward speed. Increase of forward pressure on the lever 24 results in increase in axial movement of the central part 130, thereby tending to force the belt 96 radially outwardly in the belt groove 90 and at the same time compelling the portion of the belt 96 looped in the groove 80 to seek an effective smaller diameter, which results from the yieldability of the spring 78 between the sheave parts 74 and 76 of the sheave 70. Maximum forward pressure on the lever 24 results in maximum outward travel of the belt 96 in the groove 90 and a corresponding inward travel of the belt 96 in the groove 80, thus increasing the size of the "sheave" 90 and correspondingly decreasing the size of the "sheave" 80. This will establish maximum forward speed. The forward speed is of course infinitely variable between the minimum and maximum just noted.

The right hand side of the drive is symmetrically arranged as respects that just described. For example, the right hand dual driving sheave 82 has a central part 156 and outer parts 158 and 160 respectively flanking the central part. The central part is controlled by a collar 162 actuated by a yoke 164 which, like the yoke 146 is mounted on a rockshaft, here indicated at 166, which is rocked by an arm 168 and linked at 170 to an arm 172 rigid with the right hand control lever 22. Manipulation of the lever 22 gives the same results as those obtained by the lever 24 except, of course, at the right hand side of the machine.

When both control levers 22 and 24 are moved forwardly a uniform distance, the machine will travel forwardly at the speed selected, and if one lever is moved farther forwardly than the other, the speed at that side of the machine will be increased, causing the machine to steer in the opposite direction. If both levers are pulled rearwardly, the machine will operate in reverse, and steering may be accomplished by moving one lever to a reverse position while retaining the neutral position of the other. Likewise, short-turn steering may be accomplished by driving one side of the machine in reverse and the other side forwardly. If desired, both levers 22, 24 may be biased to maximum forward positions, and disconnection of the drive may be effected by the inherent neutral condition included in the drive 28—30—32.

Brief reference will be made to Figs. 3, 4 and 5, with associated reference to Fig. 1, for the description of the coordination between the drive means 84 and shiftable idler 106, as related by the control lever 24.

As seen in Fig. 3, the drive means 84 is in neutral, with both belts running or received freely in the grooves 90 and 92. Hence, the shaft 34 and means 84 are constantly rotating, but the shaft 58 is idle, as are the belts 96 and 104. In Fig. 4, when the lever 24 is shifted forwardly, the means 84 establishes drive in the groove 90 to the forward belt 96, driving the forward sheave 70 at a speed depending upon the range of forward movement of the lever 24. At the same time, the link 122, connected between the lever 24 and the arm 114 for the shiftable idler 106, moves the idler downwardly and forwardly, moving the upper run of the belt 104 at least in part away from the reverse sheave 28 so as to decrease frictional drag, since the belt 104 will be stationary and the sheave 72 will, of course, rotate forwardly since it is keyed to the shaft 58 which is being driven by the forward sheave 70 via the forward belt 96.

In Fig. 5, the lever 24 has been moved rearwardly so as to establish drive on the belt 104 in the groove 92 of the means 84, and at the same time the shiftable idler 106, being connected to the lever 24 by the link 122, is swung upwardly, bringing the upper run of the belt 104 more closely in contact with the underside of the reverse sheave 72, thereby establishing reverse drive. In this instance, the forward belt 96 runs idly in the now widened groove 90. Since reverse travel occurs relatively infrequently, no special provision need be made for accommodating reverse travel of the belt 96, as is required in the case of the reverse belt 104 as controlled by the idler 106. However, arrangements of this character could be made if desired.

Other variations in the preferred embodiment of the invention as illustrated above may be readily resorted to in the exploitation of the invention, all without departure from the spirit and scope of the invention.

What is claimed is:

1. A belt driven transmission, comprising: a forward driven sheave; a reverse driven sheave; a dual driving sheave including a central part and a pair of coaxial outer parts respectively flanking the central part and defining therewith a forward belt groove and a reverse belt groove, said central part being axially shiftable selectively in either direction from a central neutral position to narrow one groove while widening the other and vice versa; a forward belt looped about the forward sheave and looped about and loosely received in the forward groove when said central part is in its neutral position; an idler sheave; a reverse belt looped about the idler sheave and looped about and loosely received in the reverse groove when said central part is in its neutral position, and said reverse belt having the outer side of one run thereof in drive relation to the reverse sheave; control means connected to and for axially shifting the central part to a forward-drive position at one side of said neutral position for narrowing the forward groove so as to grip only the forward belt and thus to establish forward drive, or selectively to a reverse-drive position at the other side of said neutral position for narrowing the reverse groove so as to grip only the reverse belt and thus to establish reverse drive; means mounting the idler sheave for shifting toward and away from the reverse sheave; and means connected to and for shifting the idler sheave toward the reverse sheave in reverse-drive conditions and for shifting said idler sheave away from said reverse sheave in neutral and forward-drive conditions.

2. The invention defined in claim 1, including: means interconnecting the control means and the idler sheave for shifting the idler sheave toward the reverse sheave when the central part is shifted to its reverse-drive position and for shifting the idler sheave away from the reverse sheave when said central part is shifted to its forward-drive position.

3. The invention defined in claim 1, including: a first control arm in said control means for shifting the central part; a second control arm connected to and for shifting the idler sheave; and means interconnecting the control arms for shifting the idler sheave toward the reverse sheave when the central part is shifted to its reverse-drive position and for shifting the idler sheave away from the reverse sheave when said central part is shifted to its forward-drive position.

4. The invention defined in claim 3, in which: the interconnecting means includes a single operator element movable selectively among reverse, neutral and forward positions.

5. A belt driven transmission, comprising: a forward driven sheave; a reverse driven sheave; rotatable driving means including a forward driving sheave and a coaxial reverse driving sheave; a forward belt looped about the forward driving and driven sheaves; an idler sheave; a reverse belt looped about the idler and reverse driving sheaves and having the outer side of one run thereof in drive relation to the reverse driven sheave; control means associated with the driving means and capacitated to incur a neutral condition of said means so that both belts are idle and operative selectively to incur forward-drive and reverse-drive conditions to cause driving of the forward and reverse belts respectively via the forward and reverse sheaves; means mounting the idler sheave for shifting toward and away from the reverse sheave; and means connected to and for shifting the idler sheave toward the reverse sheave in reverse-drive conditions and for shifting said idler sheave away from said reverse sheave in neutral and forward-drive conditions.

6. The invention defined in claim 5, including: means interconnecting the control means and the idler sheave for shifting the idler sheave toward the reverse sheave when the control means incurs the reverse-drive condition and for shifting the idler sheave away from the reverse sheave when said control means incurs the forward-drive condition.

References Cited in the file of this patent

UNITED STATES PATENTS

| | | |
|---|---|---|
| 1,794,038 | Siddall | Feb. 24, 1931 |
| 2,298,535 | Krag | Oct. 13, 1942 |
| 2,589,032 | Amonsen | Mar. 11, 1952 |
| 2,660,069 | Horne et al. | Nov. 24, 1953 |
| 2,799,175 | Peck | July 16, 1957 |
| 2,859,461 | Machovec | Nov. 11, 1958 |